(12) United States Patent
Adachi et al.

(10) Patent No.: US 7,487,649 B2
(45) Date of Patent: Feb. 10, 2009

(54) METHOD FOR MANUFACTURING GLASS SUBSTRATE FOR IMAGE DISPLAY

(75) Inventors: Daisuke Adachi, Kyoto (JP); Hiroyasu Tsuji, Osaka (JP); Keisuke Sumida, Osaka (JP)

(73) Assignee: Panasonic Corporation, Osaka (JP)

( * ) Notice: Subject to any disclaimer, the term of this patent is extended or adjusted under 35 U.S.C. 154(b) by 523 days.

(21) Appl. No.: 10/499,327

(22) PCT Filed: Nov. 27, 2003

(86) PCT No.: PCT/JP03/15122

§ 371 (c)(1),
(2), (4) Date: Jun. 17, 2004

(87) PCT Pub. No.: WO2004/050569

PCT Pub. Date: Jun. 17, 2004

(65) Prior Publication Data

US 2005/0160768 A1    Jul. 28, 2005

(30) Foreign Application Priority Data

Nov. 29, 2002  (JP)  ............................. 2002-347187

(51) Int. Cl.
*C03B 18/20* (2006.01)
*C03B 18/14* (2006.01)

(52) U.S. Cl. .................. 65/99.4; 65/99.2; 65/32.5; 65/32.1; 65/29.18; 65/29.12

(58) Field of Classification Search ............... 65/99.2, 65/99.4, 32.1, 32.5, 29.12, 13, 29.16, 18
See application file for complete search history.

(56) References Cited

FOREIGN PATENT DOCUMENTS

| EP | 0 88 284 | 12/1998 |
|---|---|---|
| EP | 0 884 284 | 12/1998 |
| JP | 2001-213634 | 8/2001 |

OTHER PUBLICATIONS

Takeda, S., Yamamoto, K., Matsumoto, K., "Coloration due to colloidal Ag particles formed in float glass", Journal of Non-Crystalline Solids, 265 (2000) 133-142.*

Hayashi, Y., Matsumoto, K., Kudo, M., "The diffusion mechanism of tin into glass governed by redox reactions during the float process", Journal of Non-Crystalline Solids, 282 (2001) 188-196.*

(Continued)

*Primary Examiner*—Steven P. Griffin
*Assistant Examiner*—Jason L. Lazorcik
(74) *Attorney, Agent, or Firm*—Wenderoth, Lind & Ponack, L.L.P.

(57) ABSTRACT

The present invention provides a manufacturing method of a glass substrate for an image display device having high picture quality. The reducing force in a float furnace is controlled to be decreased so that Sn++ content on a surface of the glass substrate forming an Ag electrode is a predetermined value or less. When the resultant $Sn^{++}$ content on the surface of the glass substrate forming the Ag electrode exceeds the predetermined value, the surface is partially removed to decrease the $Sn^{++}$ content to the predetermined value or less to suppress the occurrence of yellowing of the glass substrate.

2 Claims, 6 Drawing Sheets

OTHER PUBLICATIONS

Datacolor, Colorimetric Fundamentals CIE 1976 L*a*b* (CIELAB), Accessed Mar. 15, 2007 from http://www.datacolor.com/index.php?name=Sections&req=viewarticle&artid=285.*

Masami, Kaneko, "Top and reverse discrimination method of float glass plate", Japanese Patent Publication No. JP 60-107547, Jun. 13, 1985.*

Masao, Izumo, "Plasma Display panel and glass substrate for plasma display panel as well as their production", Japanese Patent Publication No. JP 11-246238, Sep. 14, 2999.*

"Glass Substrate PD2000", Asahi Glass Co. Ltd., 2001 FPD Technology Outlook pp. 706-707.

* cited by examiner

METHOD FOR MANUFACTURING GLASS SUBSTRATE FOR IMAGE DISPLAY

DESCRIPTION

1. Technical Field

The present invention relates to a manufacturing method of a glass substrate for an image display device such as a plasma display panel (PDP).

2. Background Art

There are various types of image display devices for displaying a high definition television image on a large screen. PDPs belong to one of the various types. A PDP is hereinafter described as an example.

A PDP is formed of two glass substrates: a front/side glass substrate for displaying an image and a back-side glass substrate facing the front-side glass substrate. The front-side glass substrate has the following elements:

- a display electrode that is formed on one principal surface thereof and includes a stripe-like transparent electrode and a bus electrode;
- a dielectric film that covers the display electrode and works as a capacitor; and
- an MgO protective layer formed on the dielectric film.

Further, the back-side glass substrate has the following elements:

- a stripe-like address electrode formed on one principal surface thereof;
- a dielectric film for covering the address electrode;
- barrier ribs formed on the dielectric film; and
- phosphor layers that are formed between the barrier ribs and emit red light, green light, and blue light, respectively.

As the front-side glass substrate and the back-side glass substrate, glass substrates are used that are easily increased in area, having high flatness, are inexpensive, and are manufactured by a float method. These glass substrates are disclosed in Electronic Journal, Separate Volume "2001, FPD Technology Outlook" (Electronic Journal Co. Ltd. Oct. 25, 2000, p706-p707).

The float method is a method of forming plate-shaped glass by floating and conveying molten glass material onto molten metallic tin under reducing atmosphere. An inexpensive glass sheet having large area can be precisely manufactured in the float method, so that the float method is in widespread use in manufacturing of a window glass or the like.

When an Ag electrode made of silver material is formed on a float glass substrate (this is hereinafter called a glass substrate) manufactured by the float method, however, the glass substrate disadvantageously changes into yellow (yellows) and a colored layer is formed on the surface of the glass substrate.

This coloring phenomenon of the glass substrate is caused by the following processes:

- a silver colloid is generated by an oxidation-reduction reaction between reducing bivalent tin ions ($Sn^{++}$) existing on the glass substrate and silver ions ($Ag^+$); and
- light absorption therefore occurs near a wavelength of 350 to 450 nm.

In other words, the surface of the glass substrate is exposed to the reducing atmosphere containing hydrogen in a molding process in a float furnace. A reducing layer with a thickness of several μm containing $Sn^{++}$ of the molten tin (Sn) is generated on the surface of the glass substrate. When a bus electrode (hereinafter, Ag electrode) made of Ag material is formed on the surface of the glass substrate having the reducing layer, $Ag^+$ separates from the Ag electrode, and infiltrates into the glass substrate due to ion exchange with alkali metal ions contained in the glass substrate. The infiltrating $Ag^+$ is reduced by $Sn^{++}$ existing in the reducing layer to generate silver (Ag) colloid. The metallic silver (Ag) colloid yellows the glass substrate. The yellowing occurs also on the front-side glass substrate of a PDP where an Ag electrode is formed on a transparent electrode.

When the glass substrate, especially the front-side glass substrate, yellow, the yellowing presents a significant problem in the image display device. Due to the yellowing of the glass substrate, the panel looks yellow, the commercial value decreases, display brightness of blue decreases to change display chromaticity, and color temperature decreases to degrade picture quality especially in displaying white.

These problems occur not only in a PDP but also in a general image display device having a structure where an Ag electrode is formed on a glass substrate.

The present invention addresses the problems discussed above. The object of the present invention is to provide a manufacturing method of a glass substrate for an image display device that can suppress occurrence of yellowing on the glass substrate.

SUMMARY OF THE INVENTION

In a manufacturing method of a glass substrate for an image display device of the present invention, the reducing force in a float furnace is controlled to be decreased when $Sn^{++}$ content on the surface of the glass substrate on which an Ag electrode is formed exceeds a predetermined value.

In the manufacturing method of the glass substrate for the image display device of the present invention, the reducing force in the float furnace is firstly controlled to be decreased so that the $Sn^{++}$ content on the glass substrate on which an Ag electrode is formed becomes the predetermined value or less. When the $Sn^{++}$ content on the obtained glass substrate exceeds the predetermined value, the $Sn^{++}$ content is decreased to the predetermined value or less by removing the surface of the glass substrate.

DETAILED DESCRIPTION OF PREFERRED EMBODIMENTS

Exemplary Embodiment 1

Exemplary embodiment 1 of the present invention will be described using a PDP as an example of image display devices.

The PDP is formed of two glass substrates: a front-side glass substrate for displaying an image; and a back-side glass substrate facing the front-side glass substrate.

Figure 1:
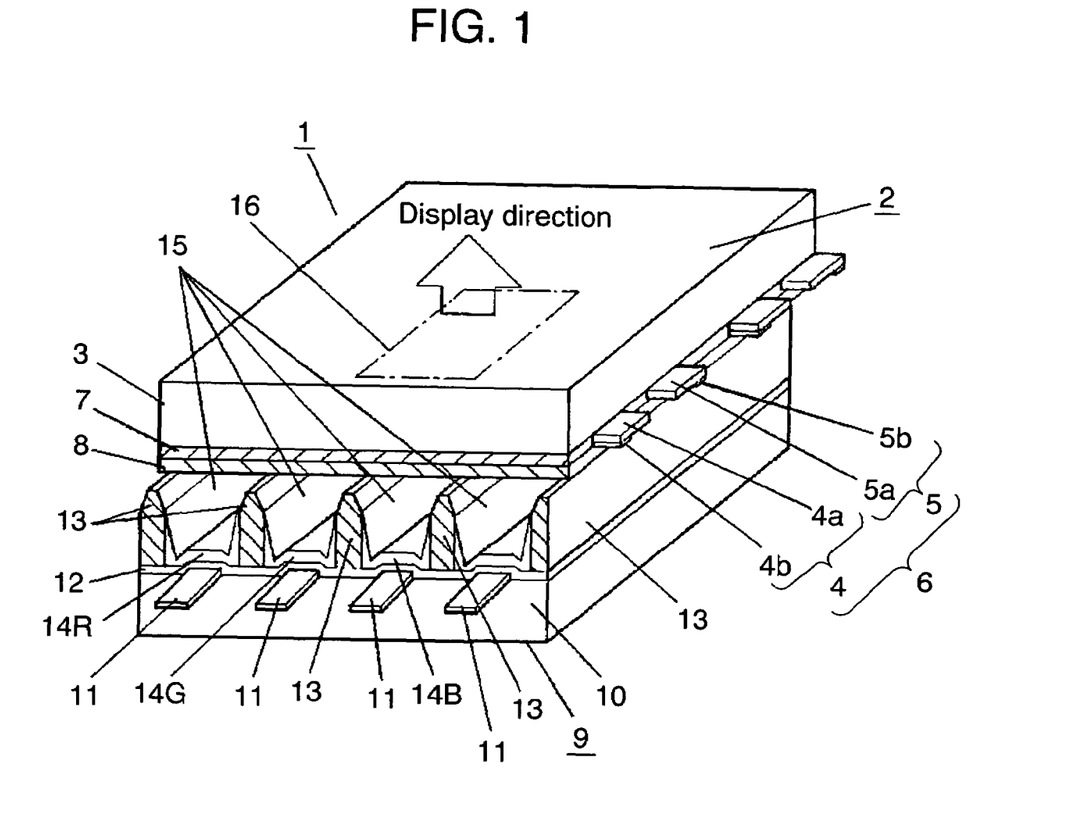
FIG. 1 is a sectional and perspective view showing a schematic structure of a PDP.

FIG. 1 is a sectional and perspective view showing a schematic structure of the PDP.

Front substrate 2 of PDP 1 is formed by sequentially laminating the following elements:
- display electrodes 6 that are formed on one principal surface of front-side glass substrate 3 and include scan electrode 4 and sustain electrode 5;
- dielectric layer 7; and
- protective layer 8, made of MgO for example.

In scan electrode 4 and sustain electrode 5, for decreasing electric resistance, bus electrodes 4b and 5b made of metal material are laminated on transparent electrodes 4a and 5a, respectively.

Back substrate 9 has the following elements:
- address electrodes 11 formed on one principal surface of glass substrate 10;
- dielectric layer 12;
- barrier ribs 13 formed on dielectric layer 12 at positions corresponding to clearances between address electrodes 11; and
- phosphor layers 14R, 14G, and 14B between barrier ribs 13.

Front substrate 2 faces back substrate 9 with barrier ribs 13 sandwiched so that display electrodes 6 are orthogonal to address electrodes 11, and the outer periphery of the image display region is sealed by a sealing member. Discharge spaces 15 formed between front substrate 2 and back substrate 9 are filled with discharge gas such as Ne-Xe 5% at pressure of 66.5 kPa (500 Torr).

Crossing parts between display electrodes 6 and address electrodes 11 in discharge spaces 15 work as discharge cells 16 (unit light emitting regions).

As front-side glass substrate 3 and back-side glass substrate 10, glass substrates are used that are easily increased in area, have high flatness, are inexpensive, and are manufactured by a float method.

In the structure discussed above, Ag electrodes 4b and 5b are formed on front-side glass substrate 3. Therefore, if front-side glass substrate 3 contains $Sn^{++}$, the glass substrate can yellow even when each of transparent electrodes 4a and 5a is interposed between each of bus electrodes 4b and 5b and glass substrate 3. Depending on the degree of the yellowing, an image display characteristic of the image display device is adversely affected.

For investigating an effect on the characteristic, $Sn^{++}$ content on front-side glass substrate 3 of PDP 1 is analyzed. Here, Ag electrodes 4b and 5b are to be formed on front-side glass substrate 3. When appearance quality is significant, $Sn^{++}$ content on back-side glass substrate 10 is similarly analyzed. Here, address electrodes 11 made of Ag material are to be formed on back-side glass substrate 10.

Specifically, a reflectance of the glass substrate at the wavelength of 220 nm is measured. This method is provided based on the inventors' study. The inventors found the following facts:
- the reflectance near the wavelength of 220 nm increases with increase in the $Sn^{++}$ content on the glass substrate; and
- there is a correlation between the reflectance and coloring of the glass substrate by silver colloid.

The reflectance is measured by a general measuring device.

The $Sn^{++}$ content on the glass substrate is determined by a secondary ion-mass spectrometry (SIMS) or an inductively-coupled plasma (ICP) optical emission spectrometry.

A predetermined values as an allowance of $Sn^{++}$ content against yellowing of the glass substrate is determined based on a calibration curve derived from the relation between the $Sn^{++}$ content on the glass substrate determined by the spectrometry and the measured reflectance. The predetermined value of $Sn^{++}$ content can be therefore determined from the reflectance without breaking the glass substrate.

Study results of the inventors are hereinafter described.

Figure 2:
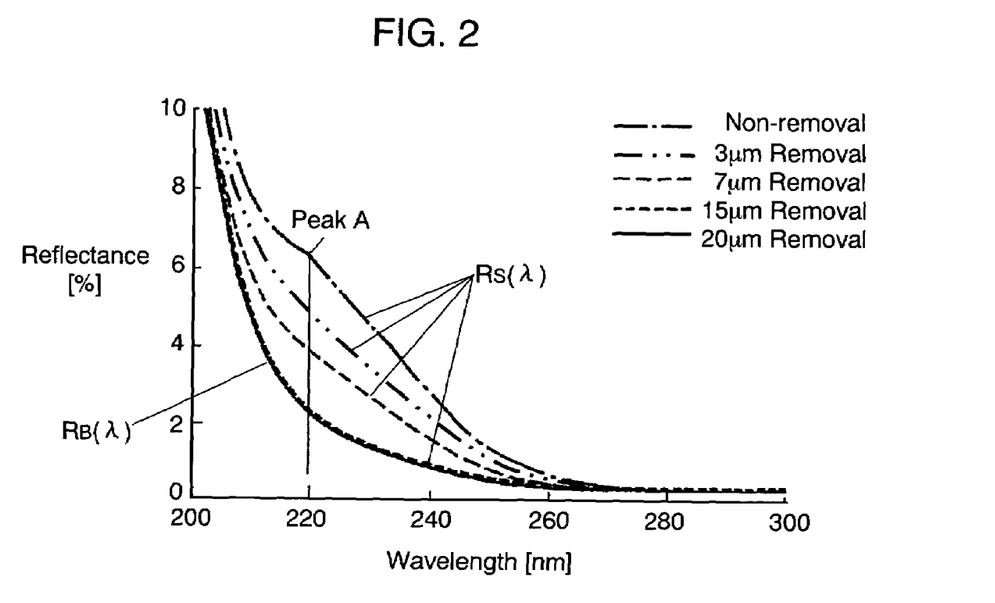
FIG. 2 is a graph showing a relation between a surface removing amount and a reflection spectrum of a glass substrate.

Firstly, the surface on the non-contact side with tin (top side) of the glass substrate manufactured by the float method is uniformly removed by a thickness of 3, 7, 15, or 20 μm, and a reflection spectrum of the remaining glass substrate is measured at a wavelength of 200 to 300 nm. The measurement result is shown in FIG. 2. FIG. 2 also shows a measurement result of a glass substrate without removal for comparison. The reason why the top side surface is removed is as follows. Adhesion and diffusion amounts of tin are less on the top side than on the contact side with tin (bottom side), so that an Ag electrode is generally formed on the top side. When the Ag electrode is formed on the bottom side, the coloring degree is two or three times higher than that in the case that the Ag electrode is formed on the top side.

FIG. 2 shows that, when the removed thickness is 15 μm or less, reflectance at peak A near the wavelength of 220 nm decreases with an increase of the removed thickness. When the removed thickness is 15 μm or more, the decrease of the reflectance stops. It is considered that the $Sn^{++}$ content monotonously decreases in the depth direction from the top side of the glass substrate. The result shown in FIG. 2 fits to this consideration. The decrease of the reflectance at peak A is therefore considered to depend on the $Sn^{++}$ content.

Figure 3:
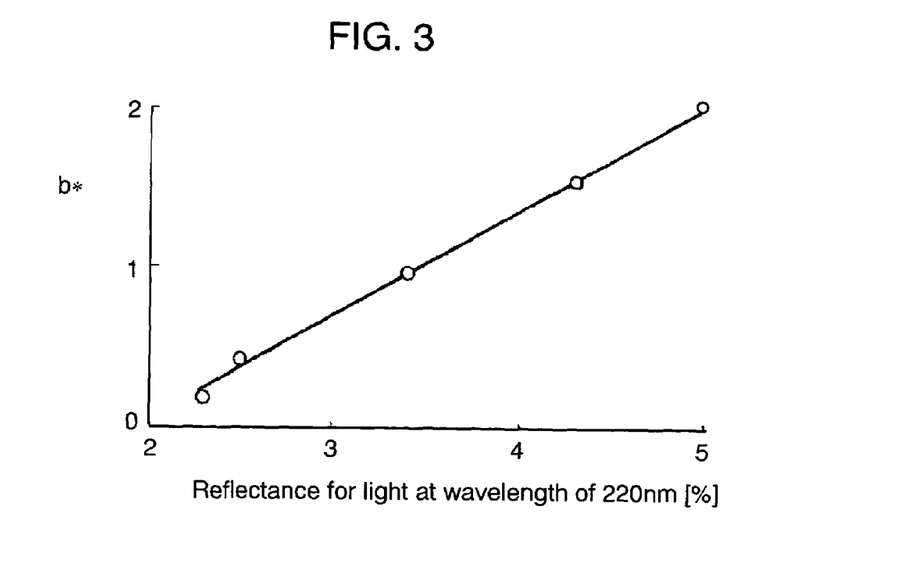
FIG. 3 is a graph showing a relation between reflectance at the wavelength of 220 nm and coloring degree (b *) of glass.

Next, for clarifying a relation between the reflectance at peak A near the wavelength of 220 nm appearing in the reflection spectrum and yellowing of the glass substrate, an Ag electrode is actually formed on the glass substrate and the coloring degree of the glass substrate is measured. In other words, 5 μm thick silver paste is applied onto the glass substrate by screen printing, they are calcined at 600° C., an Ag electrode is formed on the glass substrate, and a relation between the coloring degree of the glass substrate and the reflectance at the wavelength of 220 nm is investigated. FIG. 3 shows the investigation result. The coloring degree of the glass substrate is evaluated using b* in an L*a*b*color system (JIS Z 8729). The larger the coloring degree b* value is, the higher the degree of yellowing is. The coloring degree of the glass substrate is measured from the side having no Ag electrode.

FIG. 3 shows that the reflectance of light at the wavelength of 220 nm on the glass substrate and the coloring degree b* of the glass substrate are directly proportional.

The investigation result discussed above shows that an increase of the reflectance of the glass substrate at the wavelength of 220 nm has a correlation to the $Sn^{++}$ content in the glass substrate, namely content of reducing material at least causing yellowing. Therefore, by measuring the reflectance at the wavelength of 220 nm, the $Sn^{++}$ content in the glass substrate on which the Ag electrode is to be formed can be analyzed. The degree of yellowing of the glass substrate can be therefore estimated.

Figure 4:
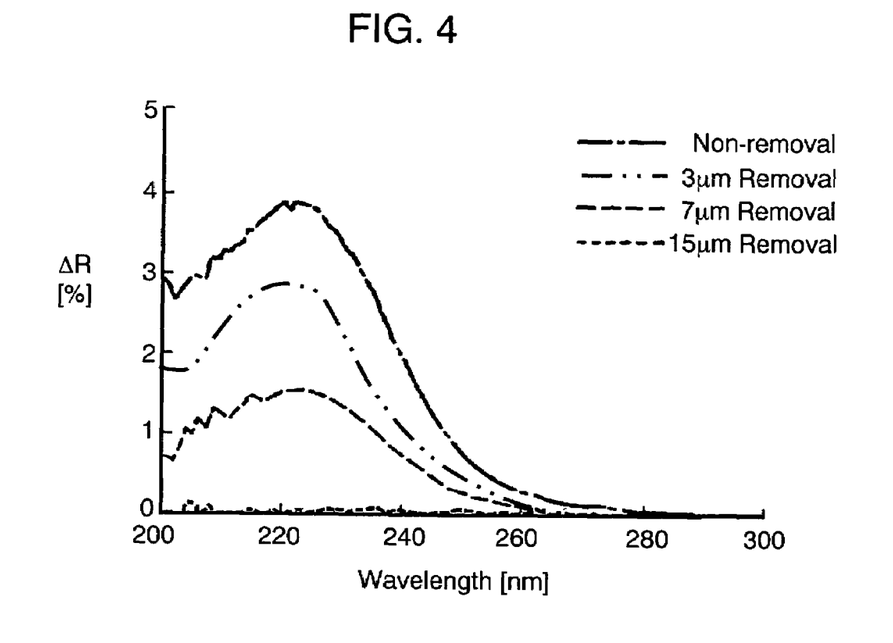
FIG. 4 is a graph showing difference ΔR between reflection spectrum $R_S(\lambda)$ of the glass substrate and reflection spectrum $R_B(\lambda)$ in a nonexistent state of $Sn^{++}$.

In FIG. 2, after a thickness of 15 μm or more of the glass substrate is removed, the reflectance (about 2%) near the wavelength of 220 nm is not resulted from existence of $Sn^{++}$ but from a bottom part of a reflection spectrum having a peak at another wavelength. The stop of the decrease of the reflectance at the wavelength of 220 nm is caused by a decrease of the $Sn^{++}$ content in the glass substrate. As shown in FIG. 4, difference $\Delta R(\lambda)=R_S(\lambda)-R_B(\lambda)$ is caused by the existence of $Sn^{++}$. Here, $R_S(\lambda)$ is a reflection spectrum of the glass substrate, and $R_B(\lambda)$ is a reflection spectrum in a state where the removal of a thickness of 15 μm or more of the glass substrate stops the decrease of the reflectance.

The reflectance at the wavelength of 220 nm may be read from a reflecting spectrum distribution shown in FIG. 2. For more precisely evaluating signal strength of the reflection spectrum having a correlation to $Sn^{++}$, the following method can be used. The reflection spectrum is firstly measured in a wider range of wavelength, for example 180 to 280 nm. The measured reflection spectrum is less divided into two Gaussian reflection spectrums, namely a component having a correlation to $Sn^{++}$ and a component having no correlation to $Sn^{++}$ shown in FIG. 5 by a curve fitting method using $$M1\exp\left\{-\frac{(1240/\lambda - 1240/M2)^2}{M3^2}\right\} + M4\exp\left\{-\frac{(1240/\lambda - 1240/M5)^2}{M6^2}\right\}. \quad \text{(Eq. 1)}$$

Figure 5:
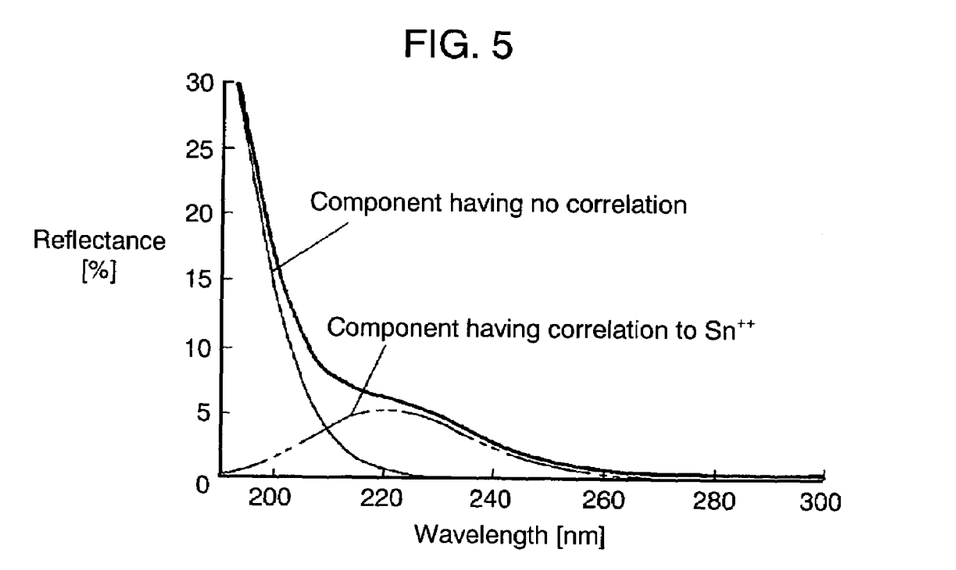
FIG. 5 is a graph showing an analyzing result of the reflection spectrum of the glass substrate.

Where, $\lambda$ is a wavelength (nm), and M1 to M6 are fitting parameters. The signal strength of the reflection spectrum having the correlation to $Sn^{++}$ is precisely determined, by comparing the peak areas of respective components having the correlation to $Sn^{++}$ with each other.

The lower limit of the measured wavelength range is set at 180 nm because oxygen in atmospheric air absorbs light and a measurement error occurs at a wavelength lower than 180 nm. Additionally, when the measured wavelength range is no lower than 180 nm, time or the like taken for the construction of a vacuum or a measuring system containing no oxygen and preparing of the measurements that are required for preventing the error is eliminated.

Figure 6:
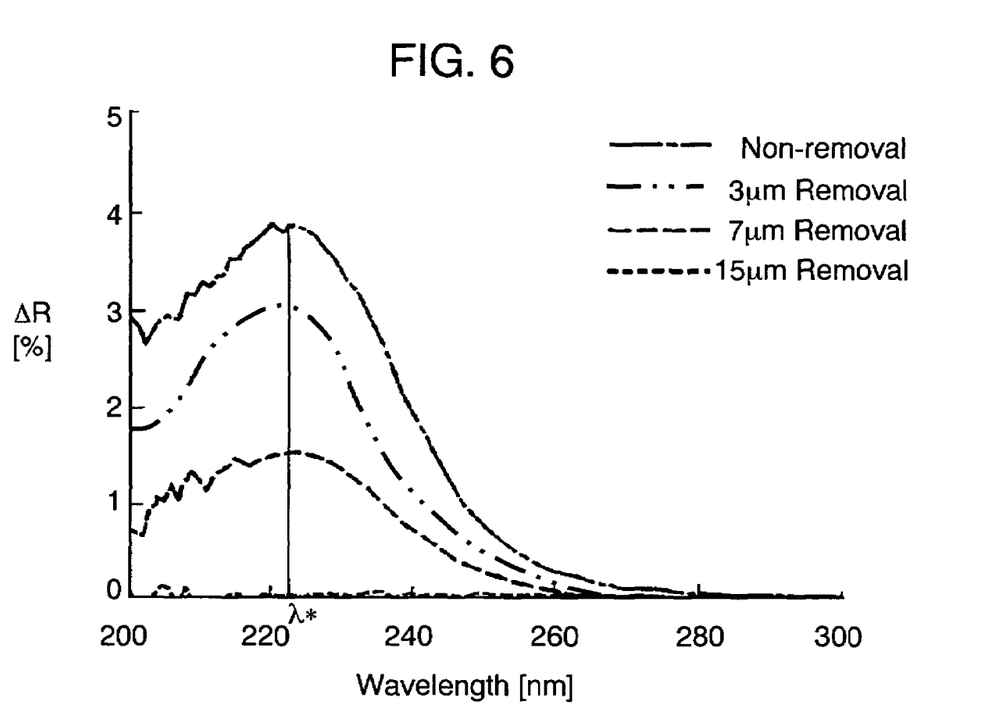
FIG. 6 is a graph illustrating wavelength λ* maximizing difference ΔR between reflection spectrum $R_S(\lambda)$ of the glass substrate and reflection spectrum $R_B(\lambda)$ in a nonexistent state of $Sn^{++}$.

The position of the wavelength of the peak of the reflectance caused by $Sn^{++}$ can slightly change depending on the manufacturing condition and the composition of the glass substrate. Therefore, measuring the reflectance in a wider wavelength range, for example 200 to 250 nm, increases analysis accuracy of $Sn^{++}$ and is more effective. Wavelength $\lambda^*$ maximizing difference $\Delta R(\lambda)=R_S(\lambda)-R_B(\lambda)$ in a wavelength range of 200 to 250 nm is considered to indicate the existence of $Sn^{++}$, as shown in FIG. 6. Here, $R_S(\lambda)$ is a reflection spectrum of the glass substrate, and $R_B(\lambda)$ is a reflection spectrum in a nonexistent state of $Sn^{++}$. The $Sn^{++}$ content in the glass substrate can be analyzed based on the reflectance $R_S(\lambda^*)$ at wavelength $\lambda^*$ or reflectance difference $\Delta R(\lambda^*)=R_S(\lambda^*)-R_B(\lambda^*)$. The reflectance difference $\Delta R(\lambda^*)$ means the maximum value of $\Delta R(\lambda)=R_S(\lambda)-R_B(\lambda)$. Here, $R_S(\lambda)$ is a reflection spectrum of the glass substrate at wavelength of 200 to 250 nm, and $R_B(\lambda)$ is a reflection spectrum in a nonexistent state of $Sn^{++}$. FIG. 2 shows that $Sn^{++}$ locally exists only in a region from the surface of the glass substrate to a depth of about 15 μm. Therefore, reflecting spectrum $R_S(\lambda)$ on the glass substrate of which the top side having thickness of 15 μm or more, preferably 20 μm or more, is removed is set as a reflecting spectrum in the nonexistent state of $Sn^{++}$.

When a reflection spectrum also including the extending bottom part of the reflection spectrum is analyzed, for example, a mean reflectance at the wavelength of 200 to 250 nm may be determined and the $Sn^{++}$ content may be analyzed.

A judgment standard for the above analysis result of the $Sn^{++}$ content in the glass substrate on which the Ag electrode is to be formed is described hereinafter.

Existence of $Sn^{++}$ reduces Ag+ of the Ag electrode to generate Ag colloid, and the glass substrate yellows. The coloring (yellowing) degree of the glass substrate is determined based on the $Sn^{++}$ content, so that the predetermined value of the $Sn^{++}$ content is a judgment standard when the glass substrate is used for an image display device. However, the measurement of the $Sn^{++}$ content is a destructive inspection and is not practical. As discussed above, therefore, the predetermined value of the $Sn^{++}$ content is based on the reflectance having a correlation to $Sn^{++}$.

As shown in the result of FIG. 2, for preventing the yellowing, it is preferable that the following parameter is smaller:

the reflectance at a wavelength indicating existence of $Sn^{++}$, such as reflectance $R_S(220)$ at the wavelength of 220 nm;

reflectance $R_S(\lambda^*)$ at wavelength $\lambda^*$ maximizing reflection spectrum difference $\Delta R(\lambda)$;

reflectance difference $\Delta R(\lambda^*)$; or mean reflectance $R_{S\cdot mean}(200\text{-}250)$ at wavelength of 200 to 250 nm.

Specifically, reflectance $R_S(220)$ is 5% or less, reflectance $R_S(\lambda^*)$ is 5% or less, reflectance difference $\Delta R(\lambda^*)$ is 3% or less, or mean reflectance $R_{S\cdot mean}(200\text{-}250)$ is 5% or less. In this case, it is verified that the $Sn^{++}$ content is so low that the yellowing of the glass substrate presents no problem even when an image display device is manufactured by forming an Ag electrode on this glass substrate.

However, the low $Sn^{++}$ content in the glass substrate can be caused by a weak reducing force of the atmosphere in a float furnace. In this case, disadvantageously, metallic tin in a tin bath continuously oxidizes and volatilizes in manufacturing the glass substrate. A content of $Sn^{++}$ in the glass substrate that is too low is not preferable.

It is therefore preferable that reflectance $R_S(220)$ is between 2.5% and 5%, reflectance $R_S(\lambda^*)$ is between 2.5% and 5%, reflectance difference $\Delta R(\lambda^*)$ is between 0.5% and 3%, or mean reflectance $R_{S\cdot mean}(200\text{-}250)$ is between 2.5% and 5%.

When a measured reflectance of the glass substrate exceeds the range discussed above, the $Sn^{++}$ content in the glass substrate exceeds the predetermined value. In this case, when an image display device is manufactured by forming an Ag electrode on the glass substrate, yellowing producing a defect in the image display device occurs.

When the $Sn^{++}$ content exceeds the predetermined value, the reducing force in a float furnace is controlled to be decreased in manufacturing the glass substrate, and the $Sn^{++}$ content of the glass substrate is decreased. For decreasing the reducing force in the float furnace, specially, hydrogen concentration in the float furnace is decreased. Mixed gas of hydrogen and nitrogen, for example, is used as atmospheric gas in the float furnace. The mixed gas contains 2 to 10 vol % of hydrogen. When the $Sn^{++}$ content is outside the predetermined value in this hydrogen concentration range, the reducing force in the float furnace is controlled by changing the hydrogen concentration. The reducing force is controlled by decreasing the hydrogen concentration when the reducing force is weak, or by increasing the hydrogen concentration when the reducing force is strong.

A manufacturing method of the glass substrate is hereinafter described with reference to FIG. 7.

Figure 7:
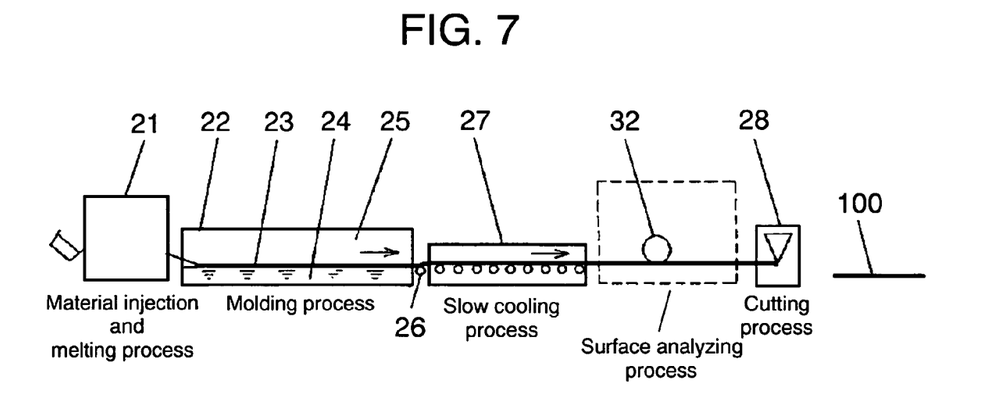
FIG. 7 is a schematic block diagram of a manufacturing apparatus of a glass substrate in accordance with exemplary embodiment 1 of the present invention.

FIG. 7 shows a manufacturing apparatus of the glass substrate in accordance with exemplary embodiment 1.

Material for the glass substrate is injected into melting furnace 21, heated to a high temperature to be molten, and then supplied to float furnace 22. Float furnace 22 has molten tin 24 in its lower part, and has reducing atmosphere 25 gas (mixed gas of hydrogen and nitrogen) for preventing oxidation of tin in its upper space.

Molten glass is continuously moved on molten tin 24 and molded as plate-like glass ribbon 23.

Glass ribbon 23 is lifted up from the tin bath and moved to allow cooling furnace 27 by conveying roller 26. Distortion occurring during the molding is decreased by slowly cooling glass ribbon 23 in slow cooling furnace 27.

After the slow cooling process, a surface analyzing process of the measuring reflectance with reflectance measuring device 32 and analyzing the $Sn^{++}$ content of the glass substrate is performed. Reflectance measuring device 32 measures the following parameter:

the reflectance at a wavelength indicating existence of $Sn^{++}$ in the glass substrate, such as reflectance $R_S$ (220) at the wavelength of 220 nm;

reflectance $R_S$ ($\lambda^*$) at wavelength $\lambda^*$ maximizing reflectance difference $\Delta R$ ($\lambda$);

reflectance difference $\Delta R$ ($\lambda^*$); or mean reflectance $R_{S \cdot means}$ (200-250) at wavelength of 200 to 250 nm.

When the $Sn^{++}$ content is determined to exceed the allowance from the measurement of the reflectance, hydrogen concentration is controlled to decrease the reducing force in float furnace 22. For preventing yellowing, it is preferable that the reflectance is as low as possible. While, when the reducing force of atmosphere 25 gas in float furnace 22 is excessively decreased for reducing the $Sn^{++}$ content in the glass substrate, disadvantageously, metallic tin contained in molten tin 24 continuously oxidizes and volatilizes in manufacturing the glass substrate.

Therefore, when the reflectance corresponding to the $Sn^{++}$ content in the glass substrate is higher than the value discussed above, the hydrogen concentration of the atmosphere in the float furnace is controlled to be decreased. When the reflectance is lower than the value, the hydrogen concentration is controlled to be increased for preventing oxidation of metallic tin.

Finally, glass ribbon 23 is cut into an arbitrary size by cutter 28 in a cutting process, and glass substrate 100 is produced.

A PDP as an image display device manufactured using the glass substrate obtained in the manner discussed above does not generate yellowing that affects the image display characteristic thereof and can display a good image.

This reflectance measurement can be performed nondestructively, in a non-contact manner, and in a short time, so that the measurement is applicable also to a process control of a manufacturing process of a glass substrate. The image display device is especially required to be uniform on its surface, so that the reflectance is preferably measured at a plurality of positions for recognizing dispersion on the glass substrate.

The $Sn^{++}$ content can be evaluated by the secondary ion-mass spectrometry (SIMS) or the inductively coupled plasma (ICP) optical emission spectrometry. However, these methods are destructive inspections and can be hardly used for measurement on a large area, so that the methods are inappropriate for in-line measurement of the $Sn^{++}$ content in a glass substrate in the glass substrate manufacturing process. When the $Sn^{++}$ content in a predetermined sample is measured using the methods, reflectance of the sample is measured, and a calibration curve is prepared, however, the $Sn^{++}$ content can be determined based on the reflectance.

When the $Sn^{++}$ content exceeds the predetermined value, the glass substrate may be used as the back-side glass substrate of the image display device. When the $Sn^{++}$ content is the predetermined value or less, the glass substrate may be used as the front-side glass substrate of the image display device.

Exemplary Embodiment 2

A manufacturing method of a glass substrate in accordance with exemplary embodiment 2 of the present invention will be described with reference to FIG. 8. Processes different from those of exemplary embodiment 1 will be mainly described.

Figure 8:
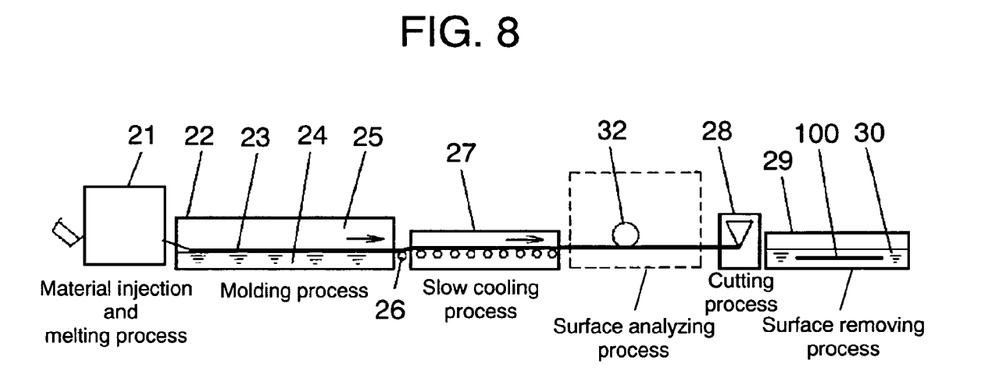
FIG. 8 is a schematic block diagram of am manufacturing apparatus of a glass substrate in accordance with exemplary embodiment 2 of the present invention.

FIG. 8 is an example of a manufacturing apparatus of the glass substrate in accordance with exemplary embodiment 2.

When the $Sn^{++}$ content exceeds the predetermined value even if the reducing force in float furnace 22 is controlled to decrease in exemplary embodiment 1, as shown in FIG. 8, a surface removing process is performed in surface removing furnace 29.

In other words, the surfaces of the glass substrate forming the Ag electrode is partially removed until the $Sn^{++}$ content becomes the predetermined value or less in the surface removing process.

The surface removing process can be performed by a chemical method or a physical method. In the chemical method, the glass substrate surface is etched by dipping glass substrate 100 into etchant 30 such as aqueous hydrofluoric acid or aqueous sodium hydroxide. The physical method includes a buffing method or a sand blasting method. Sufficient surface removing thickness is about 3 to 15 μm, as shown by the study of the reflectance or the like.

The $Sn^{++}$ content in the glass substrate is thus certainly decreased by controlling the reducing force in float furnace 22 to be decreased and by partially removing the surface of the glass substrate.

Since the surface of the glass substrate manufactured so that the $Sn^{++}$ content of the glass substrate is decreased is further partially removed, removed thickness of the glass substrate surface can be decreased as compared to the case of partially removing the surface without controlling the reducing force in float furnace 22. When the reducing force in float furnace 22 is not controlled, as shown in FIG. 2, $Sn^{++}$ exists in a range from the glass surface to a depth of about 15 μm. For thoroughly removing the $Sn^{++}$, the glass substrate having a large area must be uniformly removed by thickness of 15 μm or more, preferably 20 μm or more. This removing process requires a mirror finish after the removal, and increasing the removed thickness increases cost extremely, so that the decrease of the removed thickness of the glass substrate surface is extremely economical.

Exemplary Embodiment 3

A manufacturing method of a glass substrate in accordance with exemplary embodiment 3 of the present invention will be described with reference to FIG. 9. Processes different from those of exemplary embodiment 2 will be mainly described.

Figure 9:
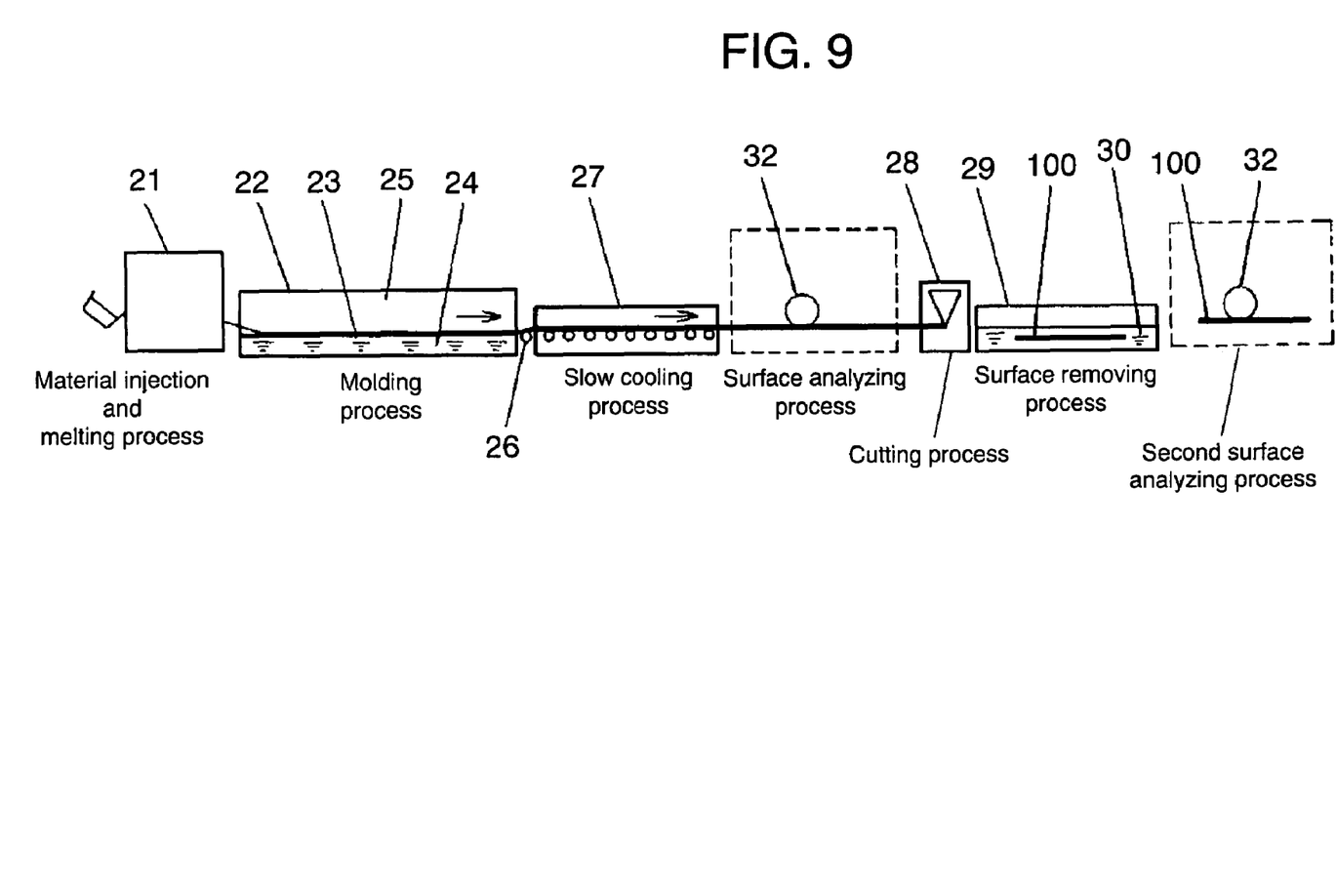
FIG. 9 is a schematic block diagram of a manufacturing apparatus of a glass substrate in accordance with exemplary embodiment 3 of the present invention.

FIG. 9 is an example of a manufacturing apparatus of the glass substrate in accordance with exemplary embodiment 3.

A second surface analyzing process shown in FIG. 9 is added after the process of partially removing the surface in surface removing furnace 29 in the manufacturing apparatus of embodiment 2.

The $Sn^{++}$ content in glass substrate 100 is analyzed by reflectance measuring device 32 in the second surface analyzing process, thereby severely controlling a surface state of the glass substrate and further increasing the advantage of embodiment 2. The advantage can be further increased by adding and repeating the surface analyzing process and the surface removing process if necessary.

An investigation result of the PDP manufactured in accordance with the present invention is described.

The surface of a glass substrate (PD-200 manufactured by Asahi Glass Co. Ltd.) manufactured by the float method is partially removed so that various amount of the reducing layer remains on the surface of the glass substrate. In other words, a maximum value of $\Delta R(\lambda)=R_S(\lambda)-R_B(\lambda)$, namely difference between reflection spectrum $R_S(\lambda)$ and reflection spectrum $R_B(\lambda)$ in a wavelength range of 210 to 250 nm, is 0.1%, 0.8%, 2.1%, 3.3%, or 4.0%. The surface removal is performed by dipping the glass substrate into etchant composed of aqueous hydrofluoric acid (10%), and the surface removing thickness is controlled using the dipping period. When the temperature of the aqueous hydrofluoric acid is set at 27° C., etching speed is 2 μm/min. After the dipping for a predetermined period, the glass substrate is washed. Then, the reflection spectrum is measured.

Using these glass substrates, three kinds of PDPs having different resolution and structure are manufactured, and a relation between reflection spectrum difference $\Delta R(\lambda)$ and coloring degree (b*) by yellowing of the PDPs is evaluated.

Three kinds of PDPs have the following structure.

PDP111 corresponds to video graphics array (VGA) (480× 640 pixel), and has transparent electrodes 4a and 5a between an Ag electrode (bus electrode) and a glass substrate. PDP222 corresponds to extended graphics array (XGA) (768×1024 pixel), and has transparent electrodes 4a and 5a between an Ag electrode and a glass substrate.

Table 1 shows a measurement result of reflection spectrum difference $\Delta R(\lambda)$ and coloring degree (b*) by yellowing of three kinds of PDPs. The value of b* is preferably as small as possible, but, actually, the yellowing has no particular problem when b* is 2 or smaller. The PDPs are verified to have no problem in the following conditions:

$\Delta R(\lambda)$ is about 3% or lower in PDP111 having the transparent electrodes between the Ag electrode and the glass substrate and having a wide pixel interval;

$\Delta R(\lambda)$ is about 2% or lower in PDP222 having the transparent electrodes between the Ag electrode and the glass substrate and having a narrow pixel interval; and $\Delta R(\lambda)$ is about 1% or lower in PDP333 having no transparent electrode.

TABLE 1

| | b* | | |
|---|---|---|---|
| ΔR[%] | PDP111 | PDP222 | PDP333 |
| 0.1 | 0.4 | 0.4 | 0.5 |
| 0.8 | 0.8 | 0.6 | 1.3 |
| 2.1 | 1.2 | 2.3 | 2.2 |

TABLE 1-continued

| | b* | | |
|---|---|---|---|
| ΔR[%] | PDP111 | PDP222 | PDP333 |
| 3.3 | 2.0 | 2.8 | 4.2 |
| 4.0 | 2.4 | 3.4 | 5.5 |

The advantage of the present invention is useful for not only a PDP but also an image display device having the structure where an Ag electrode is formed on a glass substrate having $Sn^{++}$ on its surface. This glass substrate is a glass substrate formed by the float method, for example.

INDUSTRIAL APPLICABILITY

The present invention provides a manufacturing method of a glass substrate for an image display device that can suppress occurrence of yellowing on a glass substrate and has good image display.

REFERENCE NUMERALS

1 PDP (Image display device)
2 Front substrate
3 Front-side glass substrate
4 Scan electrode
4b, 5b Bus electrodes (Ag electrodes)
5 Sustain electrode
6 Display electrode
7, 12 Dielectric layers
8 Protective layer
9 Back substrate
10 Back-side glass substrate
11 Address electrode (Ag electrode)
13 Barrier rib
14R, 14G, 14B Phosphor layers
15 Discharge space
21 Melting furnace
22 Float furnace
23 Glass ribbon
24 Molten tin
25 Atmosphere
26 Conveying roller
27 Slow cooling furnace
28 Cutter
29 Surface removing furnace
30 Etchant
32 Reflectance measuring device
100 Glass substrate

The invention claimed is:

1. A manufacturing method of a glass substrate for an image display device, comprising:
 forming the glass substrate by a float method in a float furnace, an atmosphere in the float furnace including hydrogen and nitrogen;
 measuring a reflectance of the glass substrate at a wavelength of 220 nm by a reflectance measuring device; and
 if the measured reflectance exceeds 5%, controlling a hydrogen concentration in the float furnace to be 2 vol. % or less, so as to weaken a reducing force in the float furnace and thereby control an $Sn^{++}$ content in the glass substrate.

2. A manufacturing method of a glass substrate for an image display device, comprising:

forming the glass substrate by a float method in a float furnace, an atmosphere in the float furnace including hydrogen and nitrogen;

measuring a reflectance of the glass substrate at a wavelength of 220 nm by a reflectance measuring device;

controlling the reflectance to be 5% or less by controlling a hydrogen concentration in the float furnace to be 2 vol. % or less, so as to decrease a reducing force in the float furnace;

after said controlling of the reflectance, further measuring the reflectance of the glass substrate at the wavelength of 220 nm by the reflectance measuring device; and if the further-measured reflectance of the glass substrate at a wavelength of 220 nm exceeds 5%, removing a portion of a surface of the glass substrate on which an Ag electrode is to be formed.

* * * * *